Patented Dec. 2, 1930

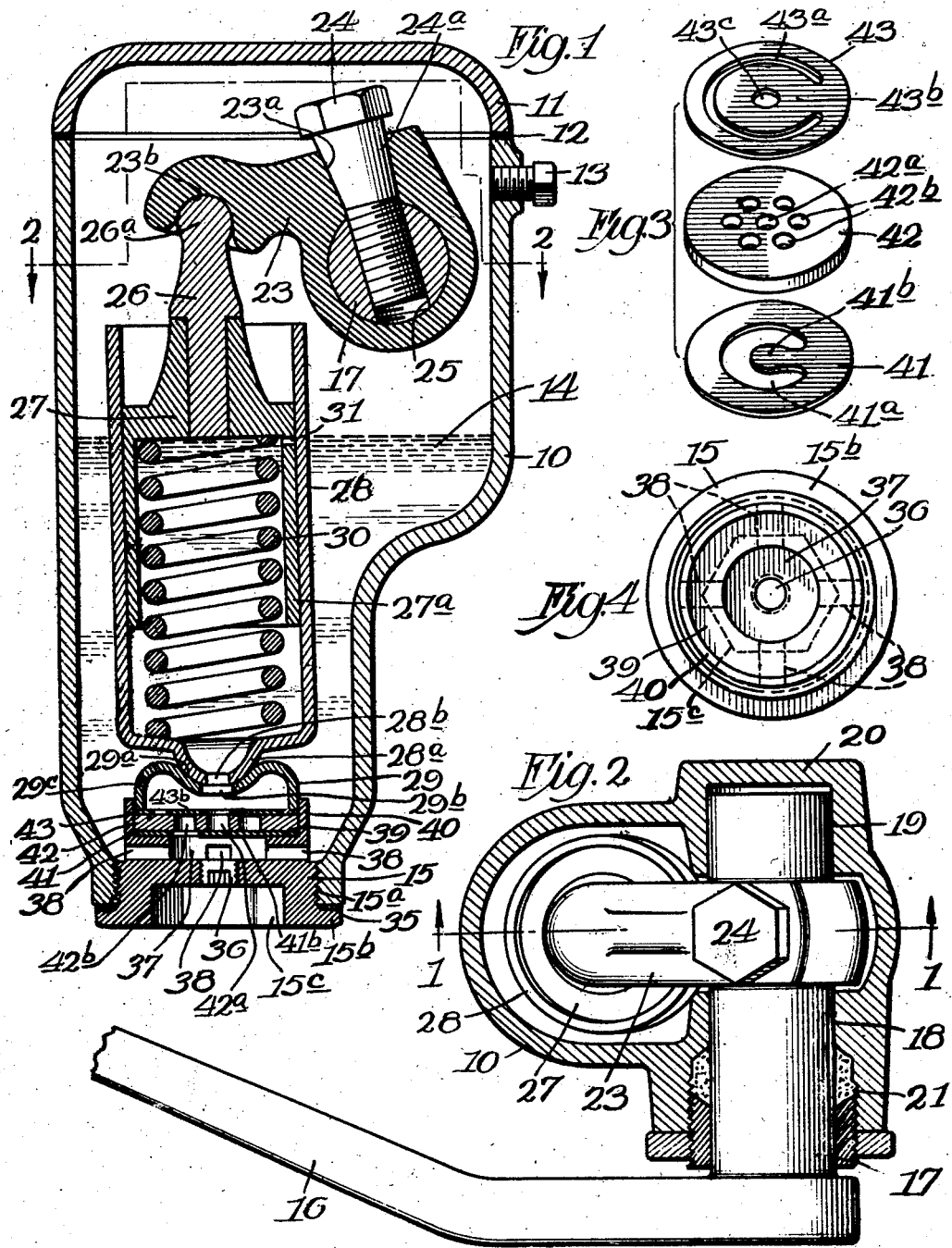

1,783,599

UNITED STATES PATENT OFFICE

DENNIS B. D. BLAKE, OF DANVILLE, ILLINOIS, ASSIGNOR OF ONE-HALF TO DONALD E. WILLARD, OF DANVILLE, ILLINOIS

SHOCK ABSORBER

Application filed April 9, 1928. Serial No. 268,546.

This invention relates to improvements in shock absorbers for automobiles and the like and its purpose is to provide improved valve mechanism adapted for use in a shock absorber of the hydraulic type for controlling the flow of fluid betwen different parts of the device. The improvements of the present invention are particularly adapted for use with the shock absorber described and claimed in the copending application of Dennis B. D. Blake and Donald E. Willard, Serial No. 266,533, filed April 2, 1928. The principal object of the invention is to provide a shock absorber adapted to be connected between the body and the axle of an automobile, for example, and comprising improved valve mechanism for controlling its operation. A further object of the invention is to provide improved means for permitting a ready flow of fluid in one direction and for allowing only a restricted flow in the opposite direction whereby the shock absorber is adapted to yield readily to a shock, but prevents a rebound therefrom. Still another object of the invention is to provide improved valve mechanism comprising a plurality of superimposed plates which are provided with a plurality of valve members and a plurality of series of apertures to be closed by the respective valve members for controlling the flow of fluid in opposite directions. Other objects relate to various features of construction and arrangement which will appear more fully hereinafter.

The nature of the invention will be understood from the following specification taken with the accompanying drawings in which one embodiment is illustrated. In the drawings,—

Figure 1 shows a vertical section through a shock absorber comprising the improvements of the present invention, the section being taken on the line 1—1 of Fig. 2;

Fig. 2 shows a horizontal section taken on the line 2—2 of Fig. 1;

Fig. 3 shows a perspective view of the complementary valve members which are embodied in the shock absorber shown in Fig. 1; and Fig. 4 shows a bottom plan view of the cap which closes the lower end of the casing shown in Fig. 1.

The invention is illustrated in the accompanying drawings in connection with a shock absorber comprising a casing 10 adapted to be secured to the body of an automobile, for example, and having a removable cover 11 which is secured in place by bolts or the like with a washer 12 inserted between the adjacent parts so that a fluid-tight closure is obtained when the cover is in place. A removable plug 13 permits the casing 10 to be partially filled with oil 14 and the lower end of the casing is provided with a threaded opening which is normally closed by a plug or casing member 15. The casing 10 contains the operating mechanism of the shock absorber which is operated through an operating lever 16 mounted on or formed integrally with a shaft 17 which is journaled in bearings 18 and 19 formed in the upper part of the casing 10. The end of the bearing 19 is closed as shown at 20 and the outer end of the bearing 18 is closed by a packing joint 21 to prevent the escape of the oil or the like which is contained in the casing. The shaft 17 has an operating arm or crank 23 mounted on the intermediate part thereof between the bearings 18 and 19. This crank is secured against rotation with respect to the shaft by means of a locking pin 24 which threadedly engages a transverse aperture 25 formed in the shaft 17 and which has a tapered portion 24$^a$ adapted to fit closely a corresponding tapered aperture 23$^a$ formed in the crank 23. The arm of the crank 23 is provided on its under side with semi-spherical recess 23$^b$ adapted to form a ball and socket connection with the ball 26$^a$ which is formed at the upper end of the rod 26 which is a piston rod connected with the hollow piston 27. This piston is adapted to reciprocate in a cylinder 28 which is open at the upper end and which has its lower end stamped or punched to form a central semi-spherical projection 28$^a$ which is adapted to coact with a similar depression 29$^a$ formed in a cap 29, thus permitting a rocking movement of the cylinder 28 with respect to the supporting cap 29. The projection 28$^a$ is provided with an aperture 28$^b$ adapted to communicate with an aperture 29$^b$ formed in the cap 29 to permit the inflow and outflow of the oil 14 as hereinafter described. A coil spring 30 is mounted within the cylinder 28 and within the tubular portion 27$^a$ of the piston with its lower end engaging the lower end wall of the cylinder and with its upper end engaging the piston so that it tends normally to move the piston 27 upwardly. A vent hole 31 is provided at the upper end of the tubular portion 27$^a$ of the piston to permit the escape of air from the cylinder on the down stroke. The foregoing feaures of construction are the same as those described in the copending application above referred to, except for a somewhat different formation of the cap 29.

The plug 15 which engages the lower end of the casing 10 has a threaded portion 15$^a$ and an overlying annular flange 15$^b$ which is adapted to seat against a washer 35. The central portion of the under side of the plug 15 is provided with a non-circular recess 15$^c$ adapted to be engaged by a wrench for applying or removing the plug. The central portion of the plug 15 is provided with a removable threaded stopper 36 which may be removed when it is desired to drain the oil 14 from the casing 10. The plug 15 is provided on its upper side with a central chamber 37 having communication through a plurality of radiating passages 38 with the chamber of the casing 10 so that the oil 14 is permitted to flow through these passages. Around the chamber 37, there is provided an annular shoulder or seat 39 which is surrounded by an upwardly extending annular flange 40. The down turned annular wall 29$^c$ of the cap 29 is adapted to fit within the upper end of the annular flange 40 and is adapted to rest upon the uppermost one of a plurality of valve members 41, 42 and 43. The lowermost valve member 41 has an opening 41$^a$ cut therefrom to form a single valve flap 41$^b$ extending from one side into the central part of the opening 41$^a$. This valve member rests upon the seat 39 and the opening 41$^a$ is adapted to lie above the outer portion of the chamber 37 with the inner end of the flap 41$^b$ located above the central part of the chamber 37. All of the valve members fit within the annular flange 40 and the valve member 41 is engaged on its upper side by the intermediate valve member 42 which is in the form of a flat circular plate having two series of openings therethrough. In this instance, the openings of one series are embodied in a single opening 42$^a$ located in the center of the valve member 42 and this opening is surrounded by a plurality of openings 42$^b$ constituting the openings of the other series. The opening 42$^a$ is normally closed by the flap 41$^b$ of the valve member 41 and the openings 42$^b$ are adapted to be closed normally by the flap 43$^b$ of the upper valve member 43 which has a curved slot 43$^a$ formed therein to form a flap 43$^b$ having a substantially circular form, except that it is attached at one side to the body portion of the valve member. The flap 43$^b$ of this valve member is provided with a central opening 43$^c$ located directly above the opening 42$^a$ in the valve member 42. The valve members 41 and 43 are formed of sheet steel or the like having sufficient resiliency to cause the valve flaps 41$^b$ and 43$^b$ to lie normally in the planes of their respective surrounding body portions 41 and 43.

In the operation of this device, the casing 10 is adapted to be secured to the body of an automobile, for example, and the arm 16 is adapted to be attached to the axle of the automobile or other similar parts having relative movement with respect to the body when the automobile springs are depressed. The piston 27 normally occupies the position illustrated in the drawings and the casing is preferably filled with oil 14 to about the level shown. When there is a relative movement of the car axle and body toward each other, as when the automobile passes over a bump, the resistance to movement of the arm 16 is temporarily removed and the piston 27 therefore moves upwardly under the influence of the coil spring 30. As this occurs, oil is drawn into the cylinder 28 through the openings 28$^b$ and 29$^b$ as permitted by the opening of the upper valve member 43 which is mounted so that the flap 43$^b$ swings upwardly under the influence of the suction created in the cylinder. The openings 42$^b$ in the plate 42 are opened to allow oil to flow upwardly from the chamber 37 into which the oil passes through the passages 38. After this upward movement, the tendency to return, due to the rebound of the automobile body, is resisted by the fact that the oil in the cylinder 28 can flow outwardly only through the central opening 42$^a$ in the intermediate valve member, the flap 41$^b$ of the lower valve member being then opened under the pressure of the downwardly moving oil. This pressure closes the flap 43$^b$ of the upper valve member so that there is only the single central opening to permit the outflow of the oil and this restricted passage retards the downward movement of the piston 27, thereby overcoming the shock which would be produced if the body of the automobile were permitted to rebound without resistance. The parts of the valve construction may be readily assembled or disassembled and it will be apparent that any desired number or arrangement of the valve openings may be provided in order to regulate the freedom of the inflow and outflow of the oil to suit the purposes to which the shock absorber is put.

It is desirable that shock absorbers, of whatever character, function in substantially the same manner under all conditions, but this has not been possible because of changes of viscosity in the oil or other liquid employed due to changes in temperature. Not only do climatic changes in temperature affect the devices but they are also affected considerably by frictional heating due to the movements of the parts and more particularly to the movement of the liquid. It is therefore desirable that the effective area of the outflow port be varied according to the varying pressures due to changes in the viscosity of the liquid. The flap 41ᵇ of the valve member 41 being of spring metal serves in a very considerable degree to compensate for differences in viscosity of the liquid, opening more or less according to the pressure put upon it.

Although one form of the invention has been shown and described by way of illustration, it will be understood that it may be constructed in various other forms within the scope of the appended claims.

I claim:

1. The combination in a shock absorber of a valve comprising a member having a plurality of openings extending completely therethrough, a valve member adapted to close a part of said openings against flow in one direction through said member, and another valve member adapted to close the remainder of said openings against flow in the opposite direction therethrough.

2. The combination in a shock absorber of a valve comprising a member having a plurality of openings therethrough, a valve disk having a flap adapted to close a part of said openings against the flow in one direction, and another valve member having a flap adapted to close the remainder of said openings against flow in the opposite direction.

3. The combination in a shock absorber of a plurality of superimposed disks, one of said disks having a plurality of openings therethrough, and the other of said disks having flaps each adapted to close one or more of said openings against flow in one direction.

4. The combination in a shock absorber of a valve comprising a plate having a central opening and a series of other openings surrounding said central opening, a valve member having a flap adapted to close said central opening against flow in one direction and having openings around said flap to permit flow through said other openings of said first named plate in the opposite direction, and another valve member having a flap adapted to close said other openings of said first named plate against flow in said first named direction and to permit flow in said opposite direction, said flap of said last named valve member having a central opening to permit flow through the central opening of said first named plate in the direction permitted by said first named valve member.

5. The combination in a shock absorber of a valve comprising a plate having a central opening and a series of surrounding openings, a resilient metal valve disk seated against one side of said plate and having a flap adapted to close said central opening, and another resilient metal valve disk seated against the other side of said plate having a flap adapted to close said surrounding openings and having an opening therethrough to permit the flow through said central opening.

6. The combination in a shock absorber of a member having an upwardly extending annular flange, a series of valve plates seated within said annular flange, a cap mounted on the uppermost valve plate within said flange and having an opening therethrough, and a cylinder mounted on said cap and having an opening communicating with the opening within said cap, said valve plates provided with openings and valve members adapted to permit a ready flow of fluid in one direction into said cylinder and to allow only a restricted flow in the opposite direction from said cylinder.

7. The combination in a shock absorber of a casing for containing fluid, a plug engaging said casing, said plug having a central chamber surrounded by an annular flange, said plug being further provided with passages communicating with said central chamber, a plurality of valve disks seated on said plug within said annular flange, a cap member seated on said valve disks within said flange, a cylinder engaging said cap member and having communication therewith, said valve disks comprising an intermediate disk having a plurality of openings therethrough and two outer disks adapted to permit a restricted flow of fluid in one direction through said intermediate disks and to allow a relatively free flow of fluid in the opposite direction through said intermediate disks.

8. In a device of the class described and in combination with the cylinder thereof, valve means for controlling the inflow and outflow of liquid to and from the cylinder comprising a perforated plate, a valve covering certain only of the perforations opening toward the cylinder and a valve disk of resilient material having formed therewith a valve member covering another of the perforations and opening away from the cylinder.

9. In a shock absorber of the class described comprising a casing adapted to contain liquid, a plug closing the lower end of the casing, the upper end of which is recessed and which is formed with passages below the recess communicating therewith and with the interior of the casing, a disk having a plurality of perforations located in the recessed portion of the plug, a disk located over said perforated disk and having a valve member cut therefrom adapted to overlie some of the perforations of the first-mentioned disk to close the same against return therethrough of liquid from the cylinder and a third disk beneath said perforated disk and having a tongued valve cut therefrom to close other of said openings through the perforated disk.

10. In a shock absorber and in combination with the casing and cylinder thereof, means for controlling the flow of oil to and from the cylinder comprising a rigid disk having a substantially central opening therethrough and an opening therethrough intermediate the central opening and the periphery of the disk, a disk of resilient metal on one side of the rigid disk having an integral tongue extending over the central opening and adapted to close the same against flow in one direction and to yieldingly resist flow in the opposite direction, and a second disk of resilient material on the other side of the rigid disk and adapted to close the second said opening against flow of liquid in one direction while permitting flow of liquid in the other direction.

In testimony whereof, I have subscribed my name.

DENNIS B. D. BLAKE.